(12) United States Patent  
Lanham et al.

(10) Patent No.: US 6,357,981 B1
(45) Date of Patent: **\*Mar. 19, 2002**

(54) FASTENER STRUCTURE

(75) Inventors: Thomas R. Lanham, Boston; Lewis D. McCauley, Orchard Park; Daniel J. Vriesen, Lancaster, all of NY (US)

(73) Assignee: McGard, Inc., Orchard Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/556,716

(22) Filed: Apr. 21, 2000

Related U.S. Application Data (63) Continuation-in-part of application No. 09/197,043, filed on Nov. 20, 1998, now Pat. No. 6,092,968, which is a continuation-in-part of application No. 09/087,525, filed on May 29, 1998, now Pat. No. 6,036,419.

(51) Int. Cl.[7] ............................. F16B 23/00; F16B 35/06
(52) U.S. Cl. ...................... 411/431; 411/374; 411/405; 411/432; 411/533
(58) Field of Search ....................... 411/372.5, 372.6, 411/374, 429, 431, 405, 910, 919, 432, 533; 301/35.62

(56) References Cited

U.S. PATENT DOCUMENTS

| | | | |
|---|---|---|---|
| 2,277,713 A | 3/1942 | Parker | 411/374 |
| 3,354,757 A | 11/1967 | Grimm et al. | 411/919 X |
| 3,400,626 A | 9/1968 | Bergers | 411/919 X |
| 3,519,979 A | 7/1970 | Bodenstein | 411/919 X |
| 4,361,412 A | 11/1982 | Stolarczyk | 411/402 |
| 4,618,299 A | 10/1986 | Bainbridge et al. | 411/374 |
| 4,726,723 A | 2/1988 | Bainbridge | 411/432 |
| 4,824,305 A | 4/1989 | McCauley | 411/431 |
| 5,056,870 A | 10/1991 | Plumer | 301/35.62 |
| 5,324,149 A | 6/1994 | Bainbridge et al. | 411/431 |
| 6,036,419 A | * 3/2000 | Lanham et al. | 411/910 X |
| 6,092,968 A | * 7/2000 | Lanham et al. | 411/405 X |

OTHER PUBLICATIONS

Gorilla Automotive Products Catalog—Copyright 1997— pp. 20, 21, 22 and 25.

* cited by examiner

Primary Examiner—Neill Wilson
(74) Attorney, Agent, or Firm—Joseph P. Gastel (57) ABSTRACT

A fastener comprising an elongated body having a longitudinal axis and an outer surface and first and second ends, a separate seating configuration on the first end, a ridge extending circumferentially about the body adjacent to the seating configuration, a plurality of splines on the outer surface extending from the second end toward the first end and terminating at the ridge, and grooves between the splines extending from the second end toward the first end and through the ridge. The separate seating configuration can be mounted on a knurled surface with which it has an interference fit. A decorative cap can be mounted on the first end of the elongated body.

72 Claims, 9 Drawing Sheets

FASTENER STRUCTURE

CROSS-REFERENCE TO RELATED APPLICATIONS

The present application is a continuation-in-part of application Ser. No. 09/197,043, filed Nov. 20, 1998, now Pat. No. 6,092,968 issued Jul. 25, 2000 which is a continuation-in-part of application Ser. No. 09/087,525, filed May 29, 1998, now Pat. No. 6,036,419, issued Mar. 14, 2000.

STATEMENT REGARDING FEDERALLY SPONSORED RESEARCH OR DEVELOPMENT

Not Applicable

BACKGROUND OF THE INVENTION

The present invention relates to an improved fastener for use with a specialized type of automotive wheel rim which receives the fastener within an elongated relatively small diameter bore in the hub of the rim.

By way of background, there have recently come into vogue automotive rims which are known as "tuner" rims. These rims have a hub with elongated bores which receive both the axle-mounted studs and the fasteners for securing the rim to an associated axle. The bores in the hub are of relatively small diameter, and the studs which are attached to the axle are located within these bores and they occupy a relatively large portion of the diameter of the bore. In the past, the nut fasteners which were used were basically elongated, hollow tubular members open at both ends having an internal thread at one open end thereof for receiving the stud and an irregular internal configuration at the other open end thereof for receiving a wrench for turning the fastener. Nuts of this type had certain disadvantages. One disadvantage was that the nut was open at its outer end, which gave rise to a series of disadvantages. In this respect, the stud was visible and, if it were discolored or rusted, it was unsightly. Additionally, foreign matter could enter the open end of the fastener, which was also unsightly, and, further, could interfere with the attachment of the nut-turning wrench to the fastener. Additionally, the number of threads within the nut were limited because the threads and the wrench-receiving configuration were located in end-to-end relationship, and they could not overlap. It is with overcoming the foregoing deficiencies of prior art fasteners that the present invention is concerned.

BRIEF SUMMARY OF THE INVENTION

It is one object of the present invention to provide an improved fastener which can be utilized within a relatively small diameter bore which also receives a stud which occupies a relatively large portion of the diameter of the bore, with the fastener having a wrench-receiving configuration on its outer diameter which is located in close proximity to the inner surface of the relatively small diameter bore when mounted on the stud.

Another object of the present invention is to provide an improved fastener of the foregoing type which has a separate seating member on its body so that the seating member can be fabricated with selectively different materials which best suit the intended use.

A further object of the present invention is to provide an improved fastener of the foregoing type which can be fabricated by economical fabrication techniques such as broaching.

Yet another object of the present invention is to provide an improved fastener of the foregoing type which has a closed end which will obscure the stud on which it is mounted.

A still further object of the present invention is to provide an improved fastener of the foregoing type wherein the closed end is frangible in the event that its bore is too short to receive its associated stud in properly mounted relationship. Other objects and attendant advantages of the present invention will readily be perceived hereafter.

The present invention relates to a fastener comprising a body having an outer surface and first and second ends, an internal thread within said fastener, a seating configuration on said first end, and a decorative cap on said second end.

The present invention also relates to a fastener comprising an elongated body having a longitudinal axis and an outer surface and first and second ends, a seating configuration on said first end, a plurality of splines on said outer surface extending from said second end toward said first end, and said splines defining a diameter which is less than the diameter of said seating configuration.

The present invention also relates to a fastener comprising an elongated body having a longitudinal axis and an outer surface and first and second ends, a ridge extending circumferentially about said body proximate said first end, a plurality of splines on said outer surface extending from said second end toward said first end and terminating at said ridge, and grooves between said splines extending from said second end toward said first end and through said ridge.

The present invention also relates to a fastener and wrench combination, said fastener comprising an elongated body having a longitudinal axis and an outer surface and first and second ends, a seating configuration on said first end, a plurality of first splines on said outer surface extending from said second end toward said first end, first grooves between said first splines, first sides on said first splines adjacent said first grooves, and said wrench comprising second splines, second grooves between said second splines, second sides on said second splines, said second splines being received in said first grooves and said first splines being received in said second grooves with the engagement between said first sides and said second sides being at a drive angle of about 90°.

The present invention also relates to a fastener comprising an elongated body having a longitudinal axis and an outer surface and first and second ends, a separate annular seating member on said first end, and securing means for securing said separate annular seating member against rotation on said first end.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 16 is a fragmentary cross sectional view taken substantially along line 18—18 of FIG. 17;

FIG. 20 is a fragmentary cross sectional view of the annular seating member of FIG. 19 mounted on the end of the fastener body of FIG. 17;

FIG. 31 is an end elevational view of a fastener body of FIGS. 26–29 mounting a decorative cap with a monogram thereon;

DETAILED DESCRIPTION OF THE INVENTION

Figure 1:
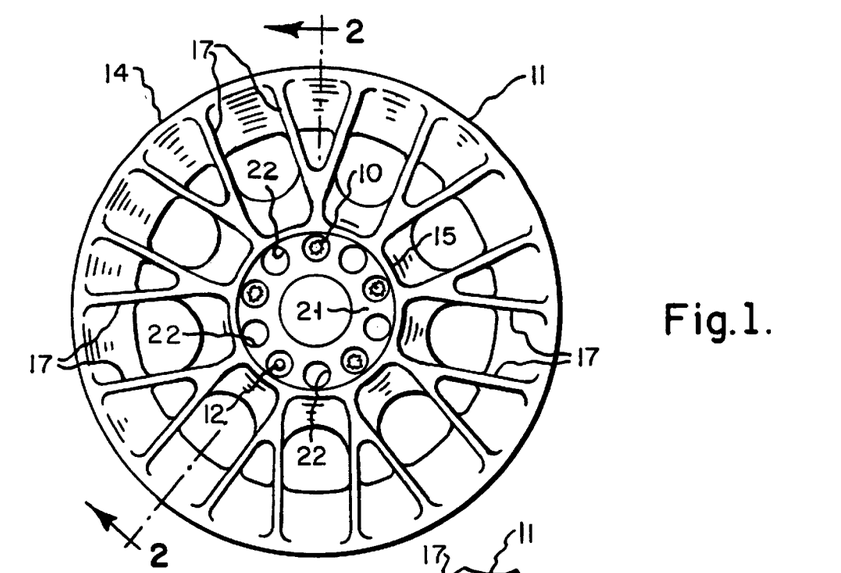
FIG. 1 is a side elevational view of a vehicle wheel rim of the type for which the improved fasteners of the present invention are used.
Figure 2:
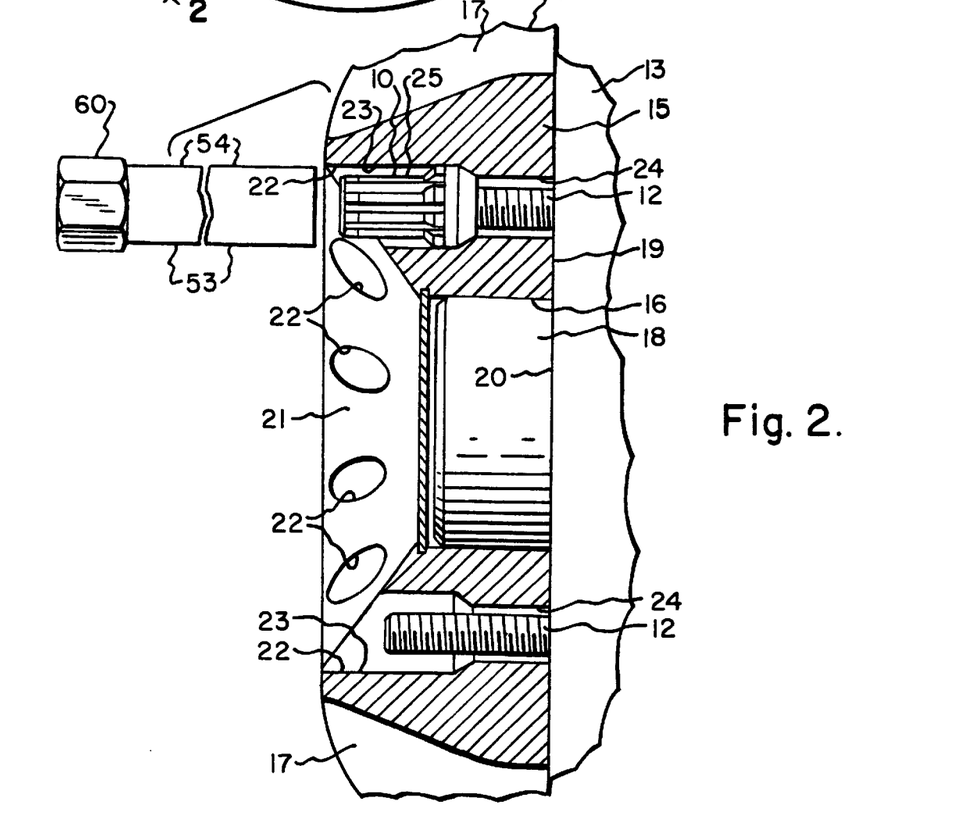
FIG. 2 is a fragmentary enlarged cross sectional view taken substantially along line 2—2 of FIG. 1 showing portions of the hub of the rim with an improved fastener in position and a wrench which is utilized for installing and removing the fasteners associated with the rim.

The improved fastener 10 of the present invention as shown in FIGS. 1–11 is in the form of a nut which is utilized to secure rim 11 to the studs 12 carried by axle 13 of an automotive vehicle. The rim 11 is known in the art as a "tuner" rim and is fabricated of a cast alloy. The rim 11 includes an outer tire mounting portion 14 and an inner hub 15 shown in cross section in FIG. 2. The hub 15 is secured to outer rim portion 14 by a plurality of generally radially extending configurations 17. The hub includes a surface 19 which abuts surface 20 of axle 13, and the inner cylindrical surface 16 of hub 15 mounts on cylindrical protrusion 18 of axle 13. Hub 15 also includes a beveled surface 21. Bores 22 extend inwardly into hub 15 and they include an enlarged portion 23 (FIG. 2) and a reduced portion 24. The studs 12 extend into bores 22 as shown in FIG. 2. As can be seen from FIG. 1, there are ten bores 22 in hub 15. However, the axle 13 carries only five studs 12 and the studs are positioned to enter every other bore 22.

The improved fastener 10 is dimensioned to fit closely in bores 22 when mounted on studs 12. The fastener 10 in the nature of a nut includes an elongated body 25 having an outer surface which has spaced splines 27 separated by longitudinal grooves 29. The grooves 29, as can be seen from FIGS. 5, 6 and 7, extend from the end 30 through ridge 31 which is circumferentially separated into spaced portions 36 by the grooves 29. The splines 27 extend substantially the entire distance between end 30 and shoulder 32 on ridge 31, the shoulder being formed by spaced inclined shoulder portions 33 of shoulder 32, and thus splines 27 extend for the major portion of the distance between the ends of fastener 10. The ends of splines 27 proximate body end 30 are beveled at 34.

Figure 8:
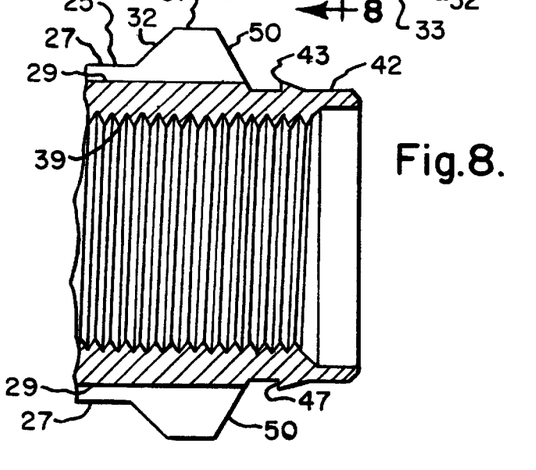
FIG. 8 is a fragmentary cross sectional view taken substantially along line 8—8 of FIG. 7.
Figure 9:
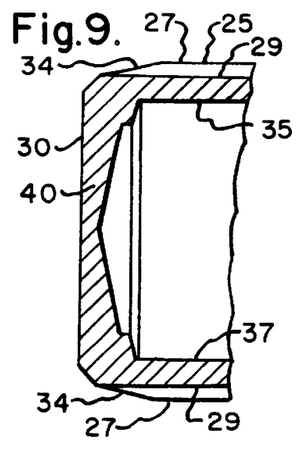
FIG. 9 is a fragmentary cross sectional view taken substantially along line 9—9 of FIG. 6.
Figure 10:
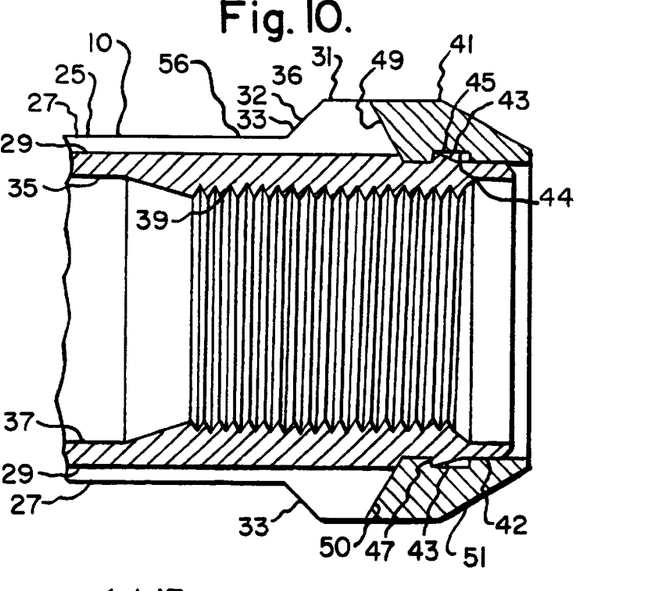
FIG. 10 is a fragmentary cross sectional view taken substantially along line 10—10 of FIG. 4.

The body 25 includes a cavity 35 having an enlarged portion 37 and a slightly smaller threaded portion 39 which receives stud 12 in threaded relationship (FIGS. 8, 9 and 10). The cavity 35 extends from the open threaded end 39 to the opposite end which is closed by a relatively thin wall 40 (FIG. 9), which thus conceals the end of stud 12 and thus obscures any rusting or discoloration of stud 12. However, since wall 40 is relatively thin, if for any reason stud 12 is too long for cavity 35, the stud can rupture the wall 40 so that fastener 10 can properly engage hub 15.

Figure 11:
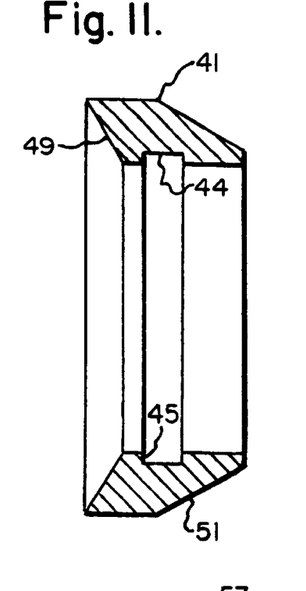
FIG. 11 is a cross sectional view of the annular seating member.

The end of body 25 remote from wall 40 mounts an annular seating member 41. In this respect the open end of body 25 includes an integral mounting extension 42 having an annular barb 43 thereon. The annular seating member 41 has an annular groove 44 therein which terminates at an annular shoulder 45 (FIG. 11). The annular seating member 41 is press-fitted onto body extension 42 with an interference fit and once it has reached its required position, the edge 47 of barb 43 will engage shoulder 45 of annular seating member 41. In this position the beveled surface 49 (FIG. 10) of annular seating member 41 will engage the tapered shoulder portions 50 (FIG. 5) of ridge 31 in complementary mating relationship. By the use of a separate annular seating member, the outer surface of the nut body 25 can be fabricated by broaching, while the addition of the annular seating member 41 provides a continuous uninterrupted seating surface 51. Also, the use of a separate annular seating member 41 permits it to be made of a different material than the nut body 25 which may also be made of different materials, as may be required for different uses. Also the nut and the seating member may have different coatings. When each nut 10 is in its fully installed position, the continuous beveled annular surface 51 of annular seating member 41 will engage annular shoulder 52 (FIG. 3) of each bore 22 in complementary mating relationship to thereby mount rim 11 onto axle 13. It is to be noted from FIG. 3 that the beveled annular surface 51 of seating member 41 engages substantially the entire annular beveled surface 52 of rim 51 to thereby provide substantially total bearing contact therewith, while the smaller diameter of the nut across splines 27 permits the wrench 53 to enter the space between splines 27 and the inner surface of portion 23 of bore 22, as will become apparent hereafter.

Figure 12:
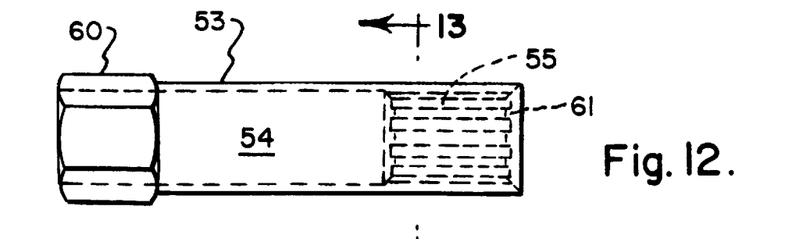
FIG. 12 is a side elevational view of the wrench which is utilized to mount and remove the nut from an associated stud.
Figure 13:
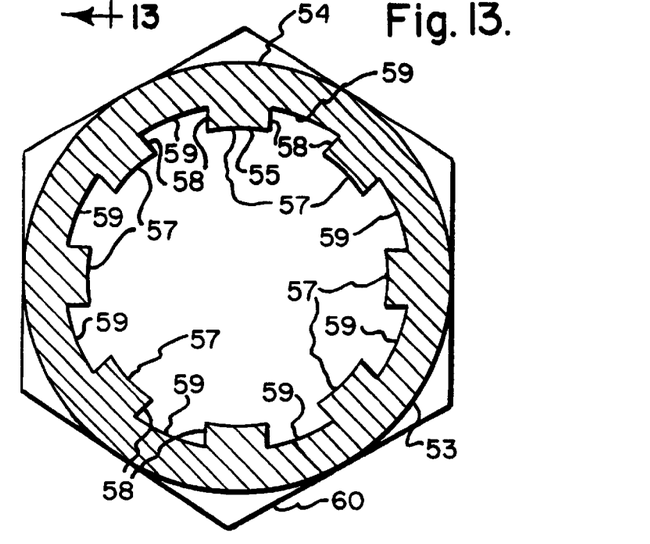
FIG. 13 is an enlarged cross sectional view taken substantially along line 13—13 of FIG. 12.

The nut 10 is installed and removed by means of a wrench 53 (FIGS. 2, 12 and 13). Wrench 53 includes a tubular body portion 54 which is internally splined at 55, with the splines 57 being of a size to be received in grooves 29 of body 25 and with the grooves 59 of wrench 53 receiving splines 27 of body 25. The sides 28 (FIG. 6) of the splines 27 of the fastener are engaged by the sides 58 of the splines 57 of the wrench 53 at an optimal drive angle of about 90° (FIG. 15), and this permits the wall of the nut to be relatively thin and still be capable of receiving high torque from its associated wrench, which may have a thin wall. As can be seen from FIG. 15, the drive angle is the angle which is produced between the resultant force vector V generated by engagement of two drive components and a radial line L drawn from the center point C of the two components, namely, the fastener 10 and the wrench 53.

As can be seen from FIG. 10, the ends 56 of the splines 27 overlap the threads 39, thereby providing a longer area of contact with an associated wrench than could be obtained if the splines were located internally within the nut. The end 60 of tubular member 54 is hexagonal for receiving a conventional wrench. As can be seen from FIG. 2, tubular body 54 is of an outer diameter which is smaller than the inner diameter of portion 23 of bore 22 so that the tubular body 54 can enter each bore 22 and slidingly inter-engage with the grooves and splines of nut body 25. The end 61 of body 54 is tapered so that it will engage shoulder portions 33 of ridge 31 in complementary mating relationship.

Figure 14:
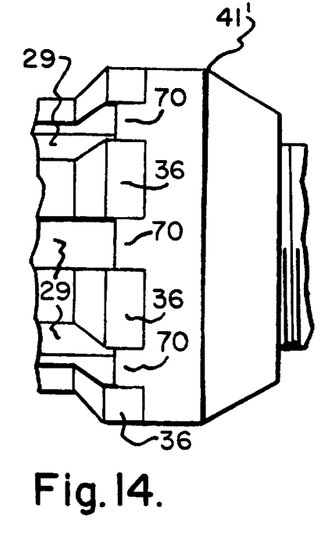
FIG. 14 is a fragmentary cross sectional view of an alternate form of annular seating member mounted on the fastener body.

In FIG. 14 an alternate annular seating member 41' is shown which has a series of protrusions 70 which fit into the portions of the grooves 29 which are located between the spaced portions 36 of ridge 31, to thereby positively prevent rotation of annular seating member 41. It will be appreciated that one or more of protrusions 70 may be used.

Figures 3, 4, 15, 16:
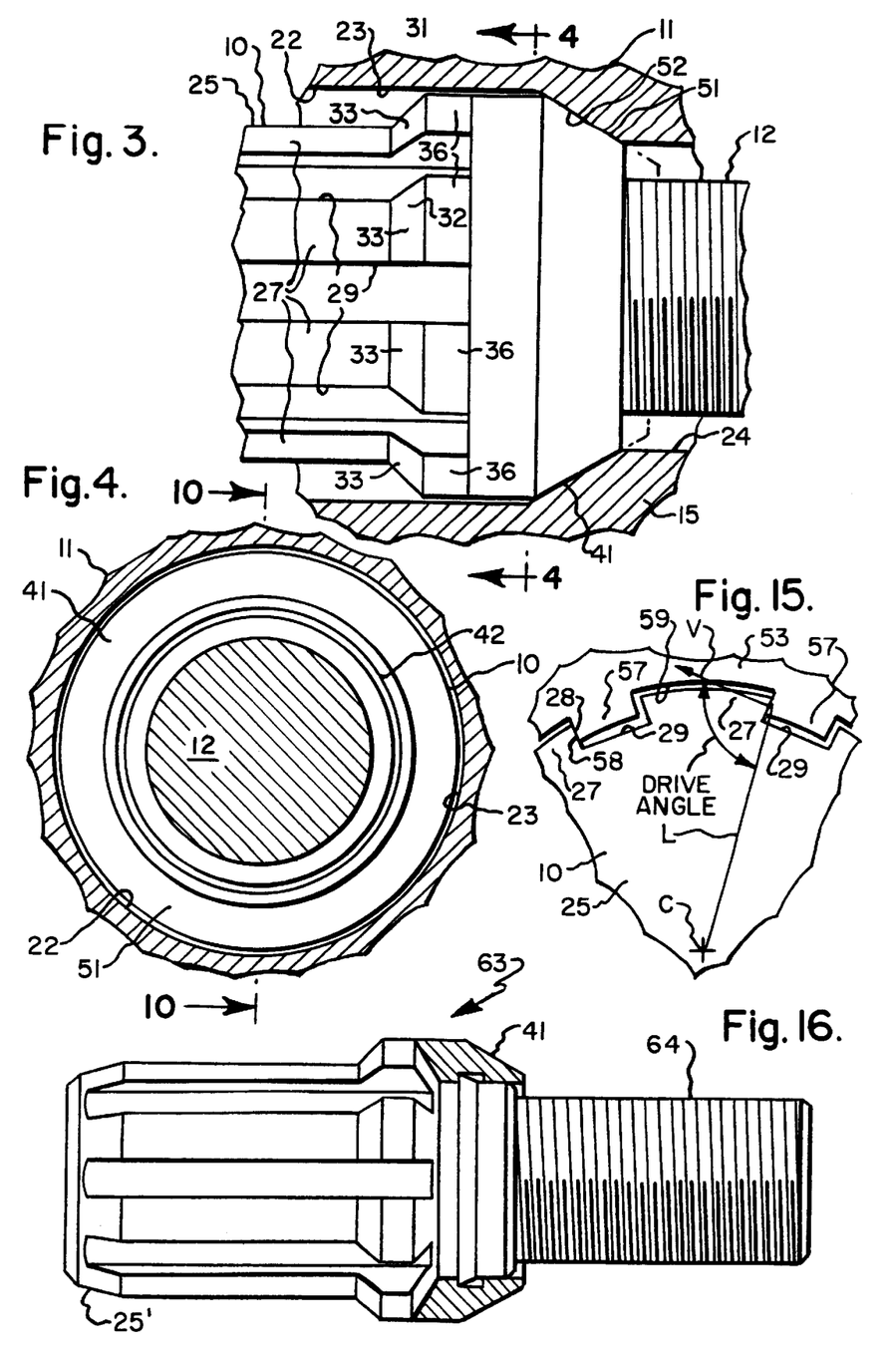
FIG. 3 is an enlarged fragmentary view of a portion of FIG. 2 showing the improved fastener of the present invention in seating relationship to the hub of the rim.
FIG. 4 is an fragmentary cross sectional view of the improved fastener taken substantially along line 4—4 of FIG. 3.
FIG. 15 is a fragmentary enlarged schematic view showing the drive angle between the wrench and the nut.
FIG. 16 is a side elevational view of a fastener, in accordance with the present invention, in the form of a bolt.

In FIG. 16 a bolt type of embodiment 63 of the fastener is shown. The only difference between this embodiment and that of FIGS. 1–11 is that it includes an integral threaded stud 64. However, the outer configuration of body 25' and the outer configuration of annular seating member 41 are identical to the outer configuration of body 25 and annular seating member 41, respectively, of FIGS. 1–11. The only difference between the nut type of fastener of FIGS. 1–11 and the bolt type of fastener 63 of FIG. 15 is that the body 25' is solid whereas the body 25 of FIGS. 1–11 is hollow to receive a stud. The fastener of FIG. 16 is utilized in the same manner as the fastener of FIGS. 1–11 except that its threaded end 64 is received in tapped bores of an axle. It will be understood, however, that the outer periphery of body 25' being the same as the outer periphery of body 25 will therefore function in the same manner as described above relative to body 25 in FIGS. 1–11 and it will be operable by means of a wrench such as shown in FIGS. 12 and 13.

In FIGS. 17–20 a modified fastener body 25' is shown. This fastener body differs only from the fastener body 25 of FIGS. 1–11 in that it has an integral mounting extension 42' which has a knurled surface 75 consisting of a plurality of axially extending ridges 77 thereon which are spaced from each other and extend around the entire periphery of mounting extension 42'. A groove 79 is located adjacent knurled surface 75, and groove 79 terminates at a shoulder 80 of annular barb 81. Annular seating member 41', which is analogous to annular seating member 41 of FIG. 11, fits onto mounting extension 42' with a sliding fit. Inner circumferential portion 82 of seating member 41' is of slightly smaller diameter than ridges 77 of knurled portion 75, and ridges 77 cut into inner circumferential portion 82 to thereby provide an interference fit which prevents annular seating member 41' from rotating relative to the mounting extension 42'. The annular surface 83 of annular seating member 41' fits flush against the tapered shoulder portions 50 of ridge 31. It is to be noted that except for the mounting extension 42', the remainder of body 25' has structure which is identical to the structure of body 25 described above relative to FIGS. 1–11, and like numerals represent like elements of structure. In the seated position of the seating member 41', barb 81 is received in annular groove 84 of annular seating member 41'.

In FIGS. 21–25 a modified embodiment of a fastener 10' is shown which may have either of the mounting extensions 42 or 42' described above. Also, fastener 10' includes a fastener body 25a wherein numerals which are identical to those used above with respect to FIGS. 1–11 denote identical elements of structure. The closed end 85 of body 25a mounts a decorative cap 87. In this respect, decorative cap 87 includes an internal annular ridge 89 which is received in annular groove 90 of body 25a with a snap fit, and annular shoulder 91 of annular groove 90 prevents decorative cap 87 from sliding off. Decorative cap 87 includes a central circular aperture 92 which fits over circular protuberance 93 on end 85. Surfaces 94 and 95 of decorative cap 87 are of a suitable color to provide a decorative affect, and this color may differ from the color at the end of protuberance 93. The shading on surfaces 94 and 95 denotes a color which differs from the color of protuberance 93.

Figure 5:
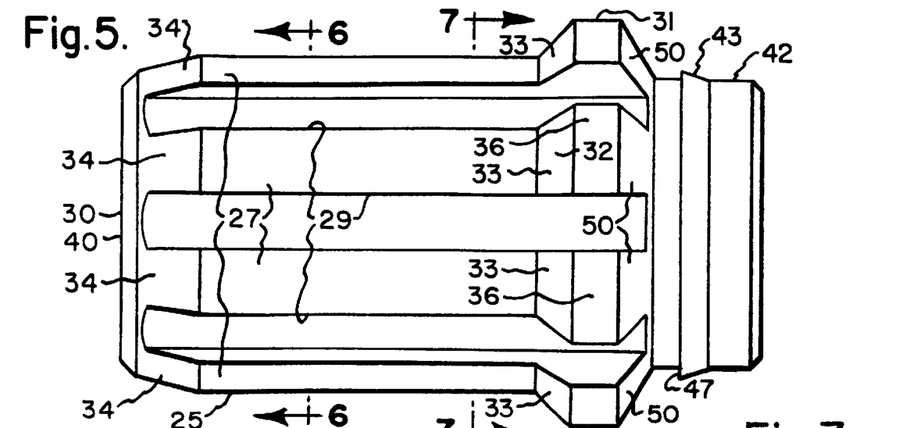
FIG. 5 is an enlarged side elevational view of the fastener body without the annular seating member thereon.
Figures 6, 7:
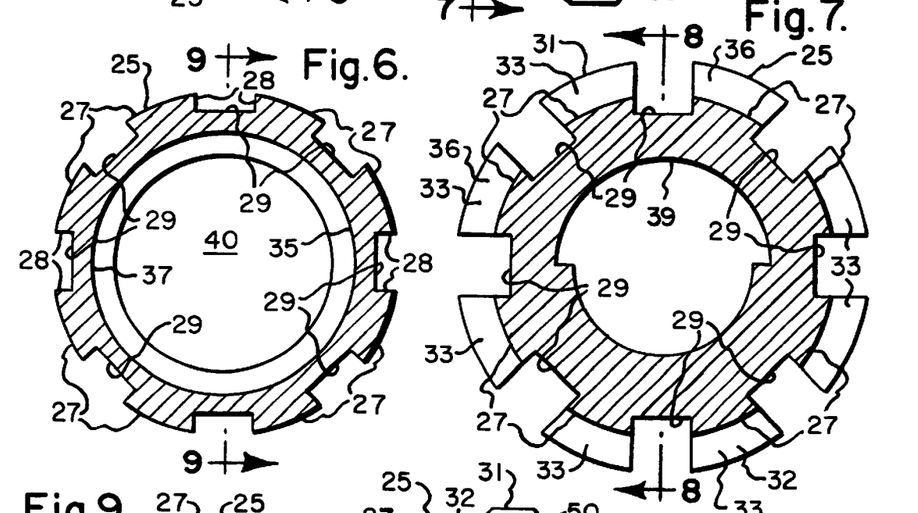
FIG. 6 is a cross sectional view taken substantially along line 6—6 of FIG. 5.
FIG. 7 is a cross sectional view taken substantially along line 7—7 of FIG. 5.
Figure 17:
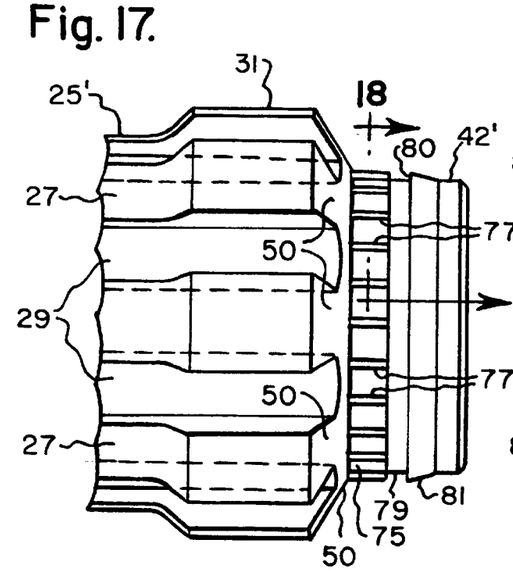
FIG. 17 is a fragmentary side elevational view of a modified form of fastener body having structure for preventing rotation of the annular seating member.

In FIGS. 26–30 another fastener 10" is shown having a fastener body 25b which may have either the integral mounting extension 42 of FIG. 5 or 42' of FIG. 17. Additionally, all parts of fastener body 25b which have numerals which correspond to the numerals of FIGS. 1–11 denote identical elements of structure. A decorative cap 97 includes an annular internal ridge 99 which is received in groove 100 on end 101 of body 25b with a snap fit. The annular shoulder 102 of groove 100 prevents cap 97 from slipping off. Decorative cap 97 is of a different color than the remainder of the fastener body 25b and the front 103 and the annular side 104 may be of this color. The shading on cap 97 denotes the different color.

Figures 18, 20, 31:
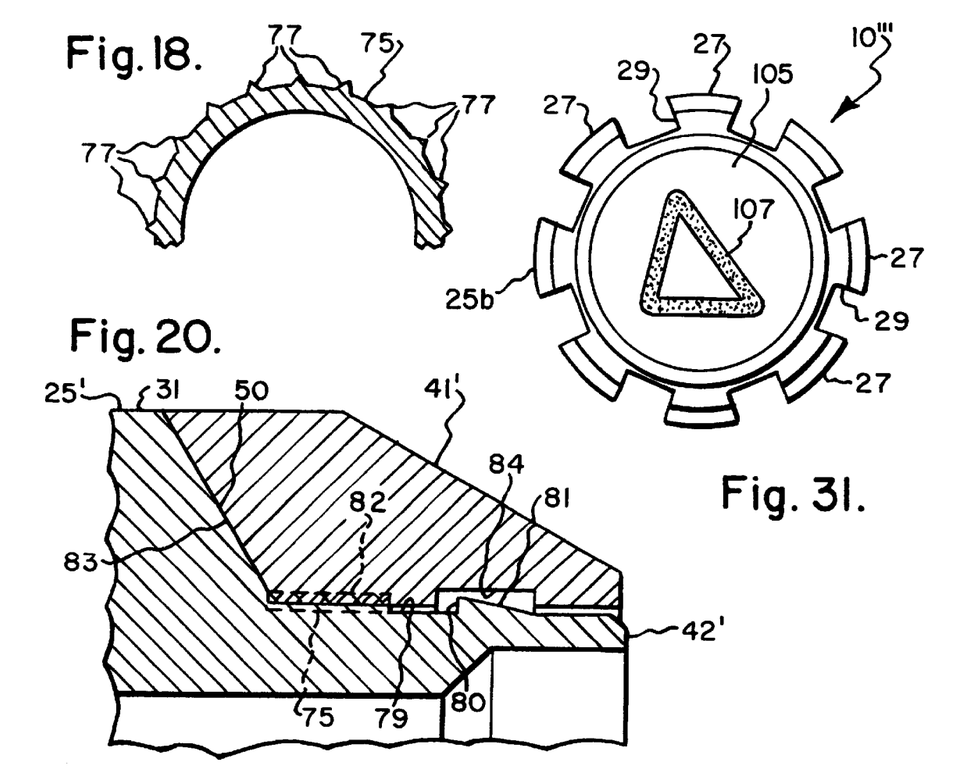
Figure 19:
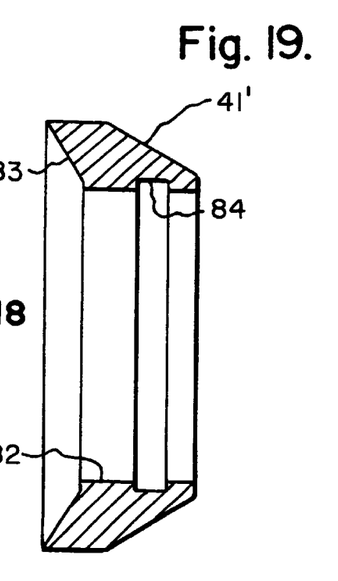
FIG. 19 is a cross sectional view of an annular seating member which fits onto the end of the fastener body of FIG. 17.
Figures 21, 22, 23, 24, 25:
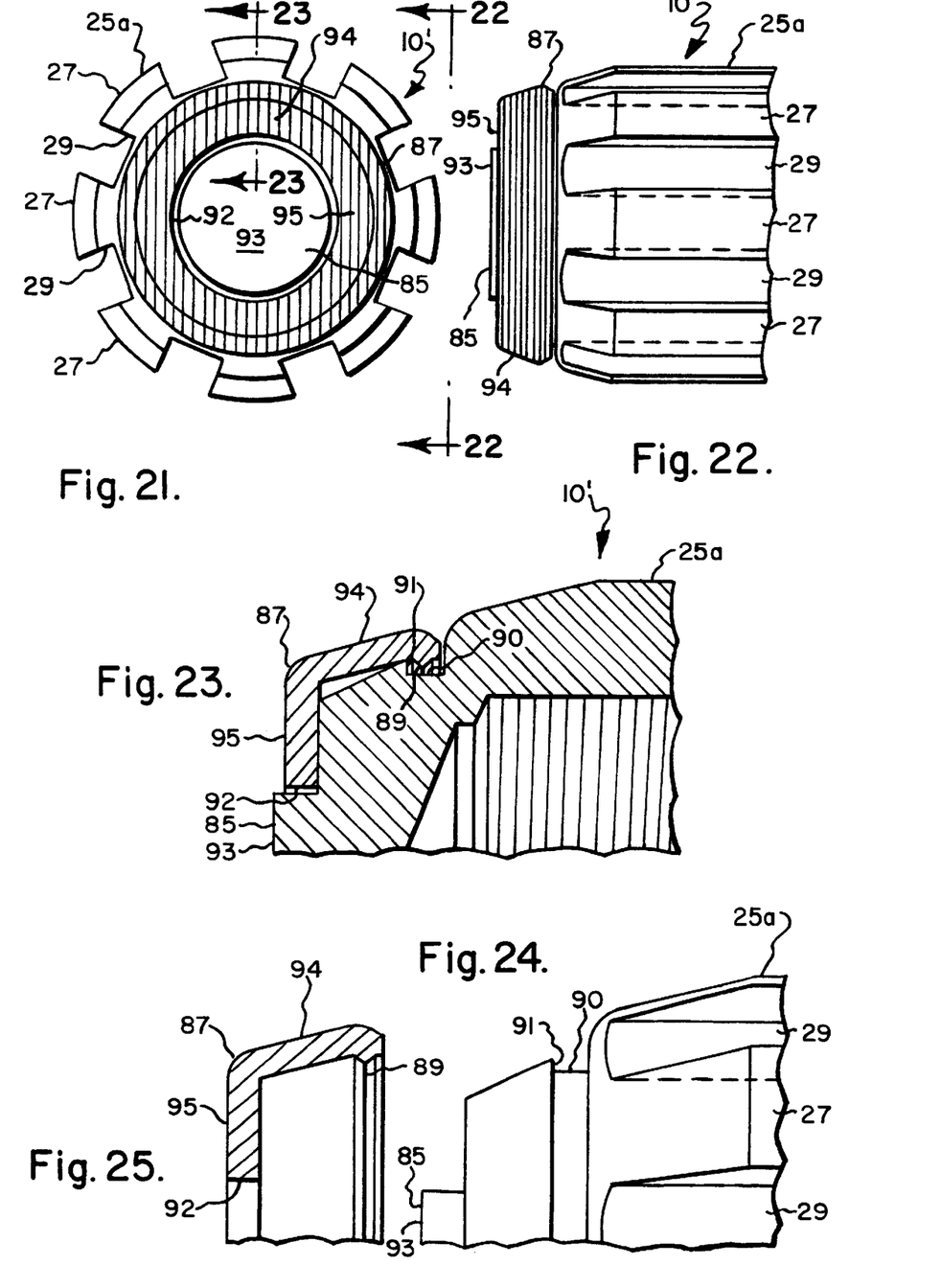
FIG. 21 is an end elevational view of a modified fastener which incorporates a decorative cap on the end thereof.
FIG. 22 is a fragmentary side elevational view taken substantially in the direction of arrows 22—22 of FIG. 21.
FIG. 23 is a fragmentary enlarged cross sectional view taken substantially along line 23—23 of FIG. 21 and showing the decorative cap mounted on the end of the fastener body.
FIG. 24 is a fragmentary enlarged side elevational view of the end of the fastener body which mounts the decorative cap.
FIG. 25 is an enlarged fragmentary cross sectional view of the decorative cap which fits onto the end of the fastener body of FIG. 24.
Figures 26, 27:
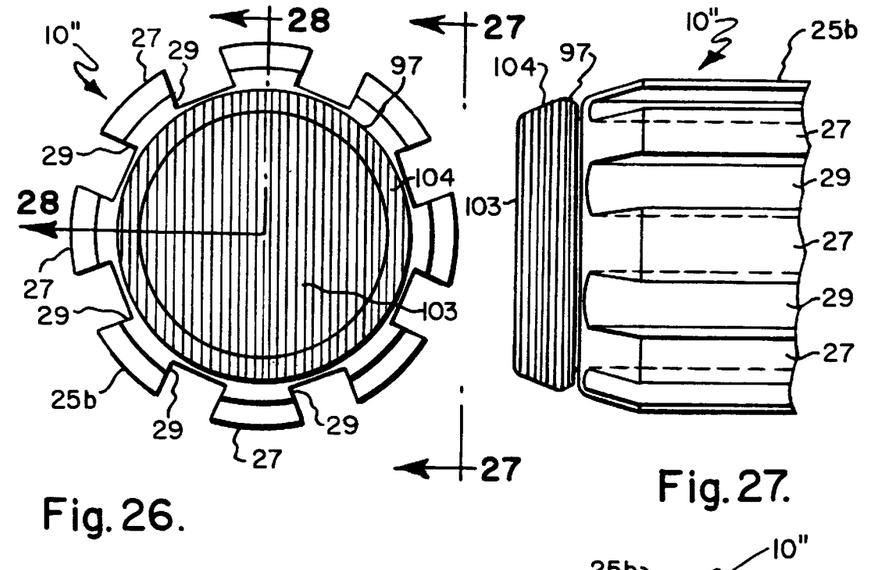
FIG. 26 is an end elevational view of a fastener body mounting another type of decorative cap.
FIG. 27 is a fragmentary side elevational view taken substantially in the direction of arrows 27—27 of FIG. 26.
Figure 28:
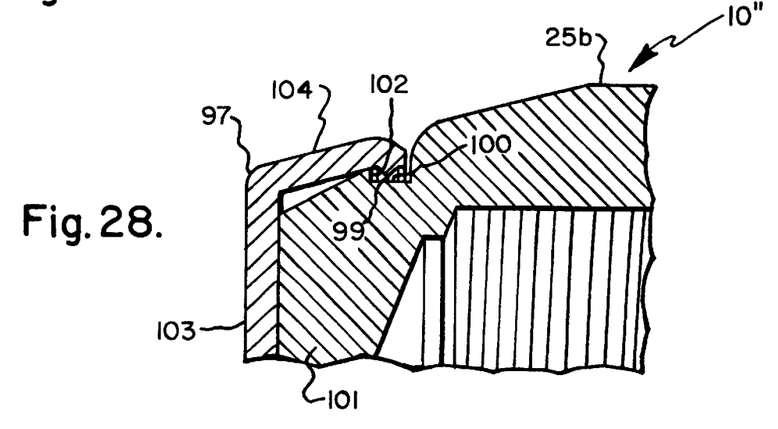
FIG. 28 is an enlarged fragmentary cross sectional view taken substantially along line 28—28 of FIG. 26.
Figures 29, 30:
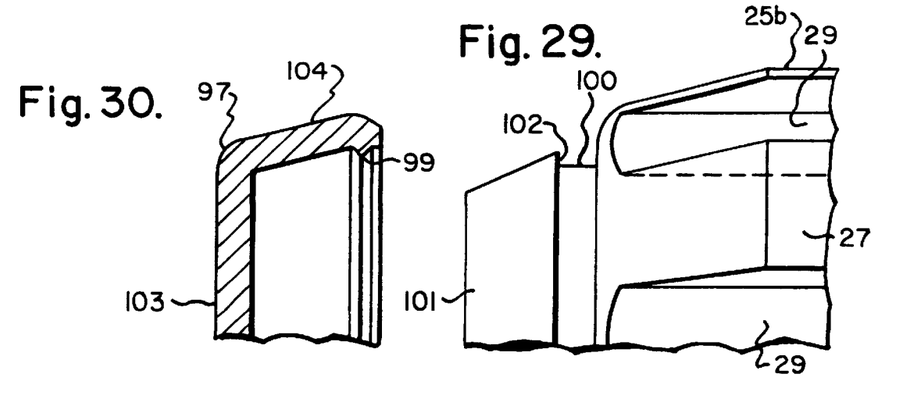
FIG. 29 is an enlarged fragmentary side elevational view of the fastener body of FIGS. 26–28.
FIG. 30 is an enlarged cross sectional view of the decorative cap which fits onto the end of the fastener body of FIG. 29.

In FIG. 31 a further modified fastener embodiment 10''' is shown. The only difference between this embodiment and that of FIGS. 26–30 is that the decorative cap 105 has a monogram 107 thereon whereas the decorative cap 97 was colored. However, the decorative cap 105 fits onto the fastener body 25b in the same manner described above relative to FIGS. 26–30.

The purpose of caps 87 and 97 is for aesthetic reasons so as to match other wheel components, such as center ornaments, in addition to providing a custom appearance. In the embodiment of FIGS. 21–25 the center portion 93 of the fastener may remain chrome plated for appearance purposes. The decorative caps 87 and 97 are preferably made of aluminum which can be anodized in any desired color, or left in a plain brushed finish which could be clear coated. However, the caps 87 and 97 may be made of any desired material.

At this point it is to be noted that the splines and grooves of the body 25' and the other bodies 25a and 25b are equally circumferentially spaced. However, if desired, they can be unequally spaced and therefore will require the use of a mating wrench so that a generally equally spaced wrench will not be able to be used. Also, there are infinite combinations of spacings, sizes and configurations of the splines and grooves so that infinite numbers of fasteners can be provided with each particular fastener requiring its own wrench.

Figure 32:
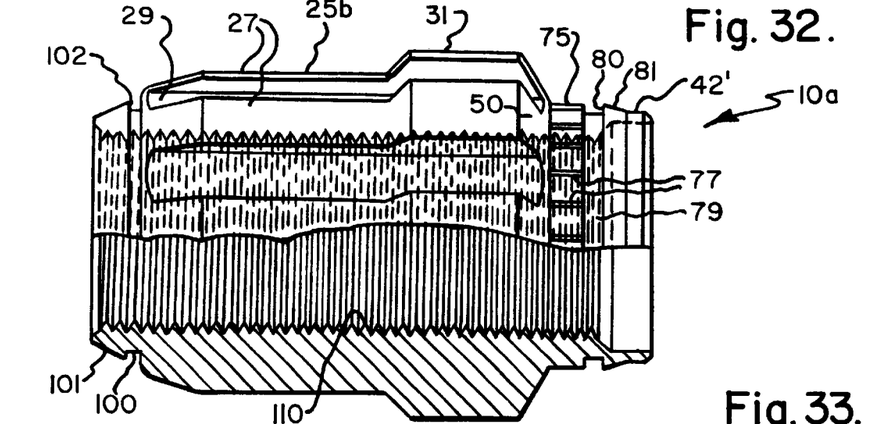
FIG. 32 is a side elevational view, partially in cross section, of another embodiment of a fastener.

In FIG. 32 another embodiment 10a of a fastener is shown which differs from features shown in the previous embodiments by having a bore which extends throughout the entire length of the fastener. A thread 110 preferably extends substantially throughout the entire length of fastener 10a, but it can extend for any desired length of the bore. Fastener 10a has numerals thereon which are identical to numerals discussed above relative to FIGS. 17–20 and FIGS. 26–30 and these numerals represent identical elements of structure. A decorative cap 97 or 105 (FIG. 31) may be mounted on the end of fastener 10a as described above relative to the above-described figures.

Figure 33:
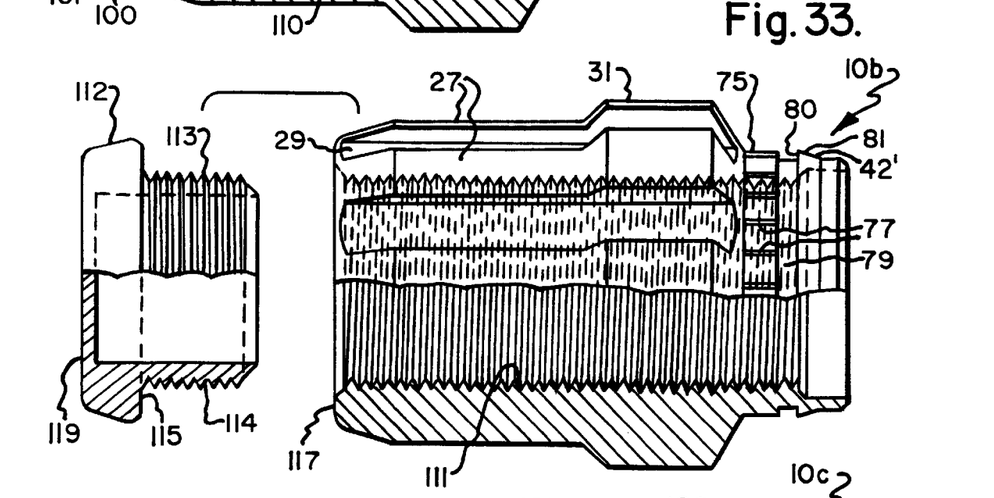
FIG. 33 is an exploded side elevational view, partially in cross section, of another embodiment of a fastener in accordance with the present invention.

In FIG. 33 another fastener embodiment 10b is shown which includes the above-described structural features of FIGS. 17–20 and FIGS. 1–11 and like numerals represent identical elements of structure. However, the embodiment of FIG. 33 differs from the fasteners described relative to the above-noted figures in that it has a thread 111 which preferably extends substantially throughout the entire length of the fastener, but which can extend through any desired portion of the fastener. The end of the fastener body receives a plug 112 having a reduced portion 113 having thread 114 thereon which is received in mating relationship by thread 111 such that when plug 112 is fully installed, shoulder 115 will bear against end 117 and the end 119 will act as a closure for threaded bore 111.

Figure 34:
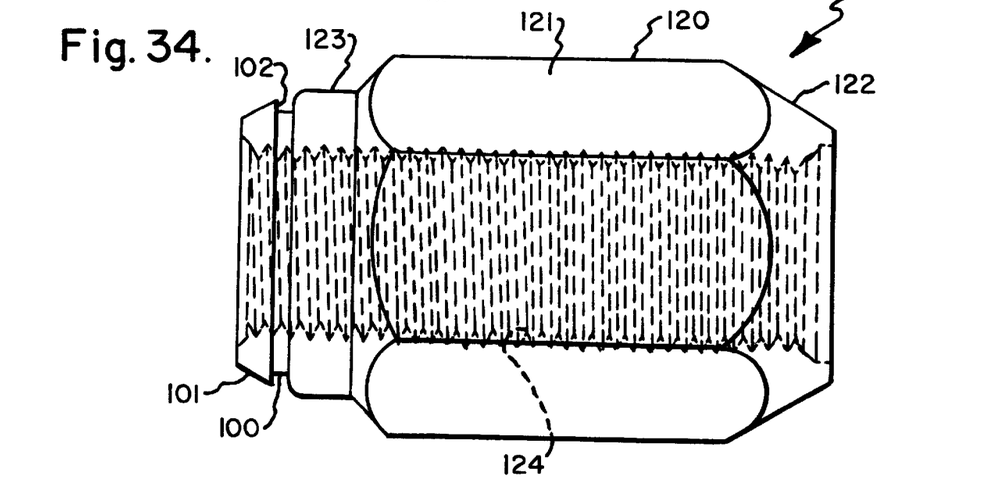
FIG. 34 is a side elevational view of still another improved fastener in accordance with the present invention.

In FIG. 34 a fastener embodiment 10c is shown which differs from the preceding embodiments in the following respects. The fastener of FIG. 34 includes a body 120 having a hexagonal outer surface 121. Fastener 120 includes an end 122 which bears against an end such as 52 (FIG. 3) of a rim. The opposite end 123 of fastener 10c includes a groove 100 and a shoulder 102 and an end 101 which were described above relative to FIGS. 26–29 for receiving a cap, such as 97, described above relative to FIGS. 26–31. The fastener 10c includes a through thread 124 which extends substantially throughout the entire length of the fastener body, but the thread can extend for any desired length of the fastener. The fastener 10c is intended to be driven by a wrench having a hexagonal bore which mates with hexagonal outer surface 121.

Figures 35, 36, 37, 40:
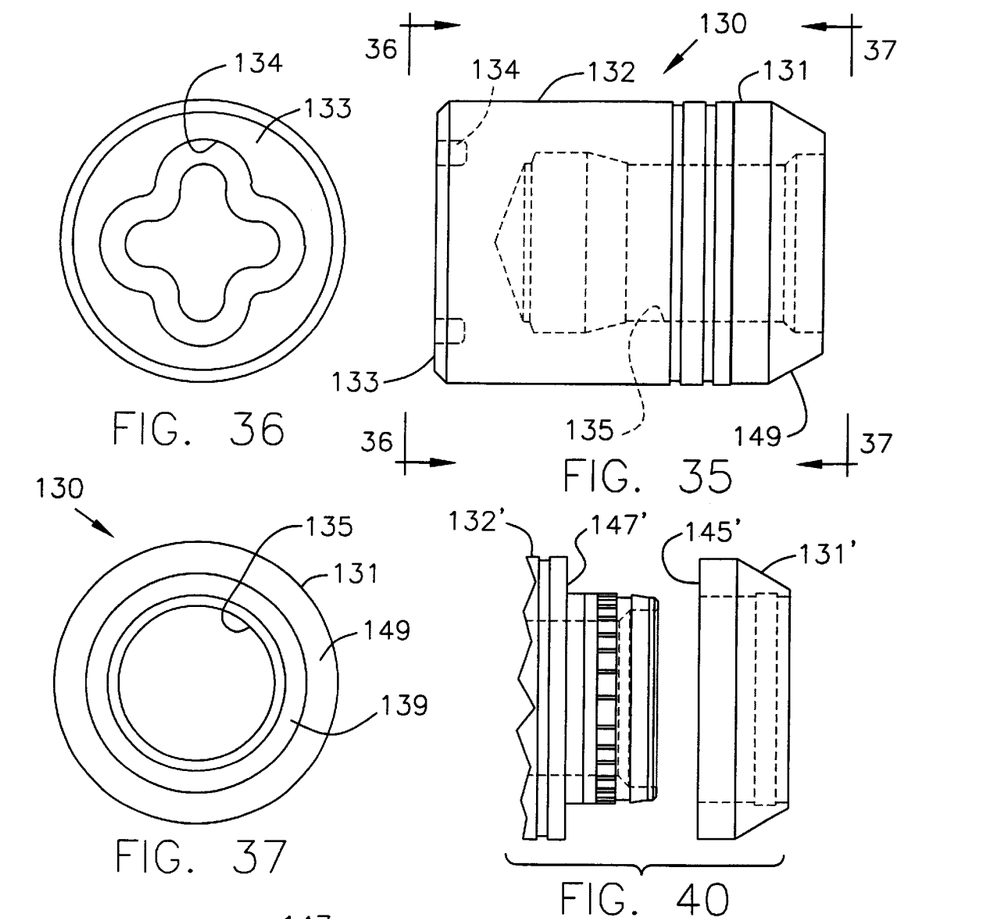
FIG. 35 is a side elevational view of another embodiment of an improved fastener having a separate seating member on its body.
FIG. 36 is an end elevational view of FIG. 35 taken substantially in the direction of arrows 36—36 of FIG. 35.
FIG. 37 is an end elevational view of FIG. 35 taken substantially in the direction of arrows 37—37 of FIG. 35.
FIG. 40 is a fragmentary side elevational view of a modification of the fastener of FIGS. 35–39.
Figures 38, 39:
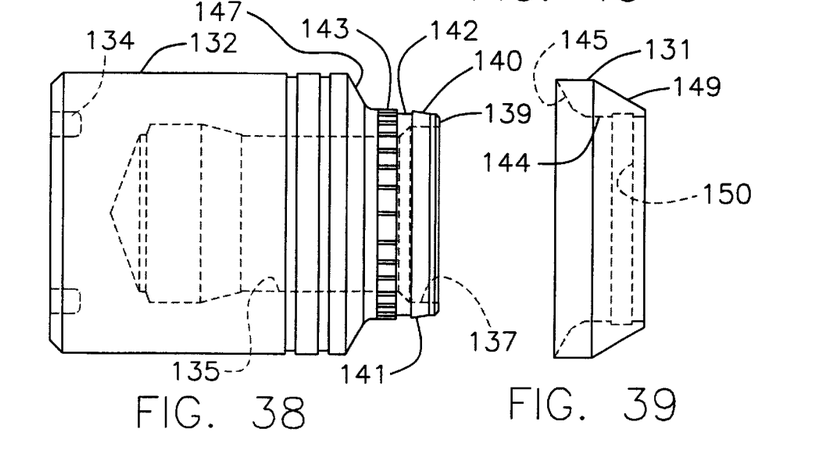
FIG. 38 is a side elevational view of the fastener body without the separate seating member mounted thereon.
FIG. 39 is a side elevational view of the separate annular seating member.

In FIGS. 35–39 another fastener in the form of a nut 130 is shown having a separate annular seating member 131 on its body 132. The end 133 of cylindrical body 132 has a curvilinear groove 134 therein for receiving a key having a mating curvilinear ridge of the type which is well known in the art. A key of this type is shown in U.S. Pat. No. 5,791,848 which is incorporated herein by reference. Fastener body 132 includes a threaded bore 135 for receiving a stud. The inner end of bore 135 is enlarged as shown in FIGS. 35 and 38. The threaded bore 135 terminates at enlarged bore portion 137 in the end 139 of body 132. Nut body 132 includes a reduced end portion 140 having an inclined annular ridge or barb 141 terminating at an annular groove 142 which is adjacent to annular knurled surface 143 of the same type described above relative to FIG. 17. The separate annular seating member 131 fits onto reduced end 140 of body 132 with the inner cylindrical surface 144 engaging annular knurled surface 143 with an interference fit and with inner annular surface 145 bearing against annular shoulder 147 on body 132. The annular seating member 131 has a beveled outer surface 149. An inner annular groove 150 within annular seating member 131 overlies inclined annular ridge or barb 141 on end 140 of body 132.

In FIG. 40 a variation of the fastener 130 of FIGS. 35–39 is shown. This variation resides in the portion of the interface area between nut body 132' and the annular seating member 131'. In this respect, body 132' has a straight annular shoulder 147' as contrasted to the inclined annular shoulder 147 of FIG. 38. Additionally, the annular seating member 131' has a straight surface 145' on the annular rim as contrasted to the inclined annular surface 145 of annular seating member 131. Aside from the foregoing two changes, all parts of the fastener of FIG. 40 are identical to the above-enumerated parts of the fastener 130 of FIGS. 35–39.

The separate annular seating members 131 and 131' may have all of the attributes and variations described above relative to FIGS. 11 and 19 insofar as they are not inconsistent therewith.

It will be appreciated that the fastener of FIGS. 35–39 may also be in the form of a bolt wherein the body has a threaded shank extending outwardly therefrom instead of having a threaded bore, as described above.

While the caps of the various figures have been described as being decorative caps, it will be appreciated that the term is intended to describe any cap which covers the end of the fastener body.

It will be appreciated that the fastener could be fabricated from steel, aluminum or any other suitable material, and the seating member could also be fabricated from steel, powdered metal or any other suitable material. Also, the fastener can be coated with decorative types of coatings such as nickel, chromium, black chromium, colored anodized finish, or any other desired finish. Also, the seating member can be coated with a mechanically functional coating such as zinc, or any other suitable coating.

While various embodiments of the improved fastener have shown a seating member, such as 41 and 41', as a separate member mounted on a fastener body, such as 25 and 25', it will be appreciated that the seating member may be made as an integral part thereof.

While preferred embodiments of the present invention have been disclosed, it will be appreciated that the present invention is not limited thereto but may be otherwise embodied within the scope of the following claims.

What is claimed is:

1. A fastener comprising an elongated body having a longitudinal axis and an outer surface and first and second ends, a seating configuration on said first end, a plurality of splines on said outer surface extending from said second end toward said first end, said splines defining a diameter which is less than the diameter of said seating configuration, a ridge on said outer surface of said body proximate said first end, said splines terminating at said ridge, and said splines including beveled ends proximate said second end.

2. A fastener as set forth in claim 1 wherein said ridge includes a shoulder facing said second end.

3. A fastener as set forth in claim 2 wherein said shoulder includes an inclined surface which is oriented in generally the same direction as said beveled ends of said splines.

4. A fastener as set forth in claim 1 wherein said fastener comprises a nut, and a thread extending inwardly into said nut from said first end.

5. A fastener as set forth in claim 4 wherein said second end of said nut is closed by an end wall.

6. A fastener as set forth in claim 5 wherein said end wall is integral with the remainder of said nut.

7. A fastener as set forth in claim 6 including a decorative cap on said end wall.

8. A fastener as set forth in claim 6 wherein said end wall is a separate member mounted on said second end.

9. A fastener as set forth in claim 8 wherein said separate member comprises a decorative cap.

10. A fastener as set forth in claim 4 wherein said ridge includes a shoulder facing said second end.

11. A fastener as set forth in claim 10 wherein said shoulder includes an inclined surface which is oriented in generally the same direction as said beveled ends of said splines.

12. A fastener as set forth in claim 1 wherein said seating configuration comprises a separate annular seating member.

13. A fastener as set forth in claim 12 wherein said ridge includes a shoulder facing said second end.

14. A fastener as set forth in claim 13 wherein said shoulder includes an inclined surface which is oriented in generally the same direction as said beveled ends of said splines.

15. A fastener as set forth in claim 12 wherein said fastener comprises a nut, and a thread extending inwardly into said nut from said first end.

16. A fastener as set forth in claim 15 wherein said second end of said nut is closed by an end wall.

17. A fastener comprising a body having a longitudinal axis and an outer surface and first and second ends, a separate annular seating member on said first end, and securing means for securing said separate annular seating member against rotation on said first end.

18. A fastener as set forth in claim 17 wherein said securing means comprises a knurled surface on said first end.

19. A fastener as set forth in claim 17 wherein said securing means comprises a barb and groove connection between said first end and separate annular seating member.

20. A fastener as set forth in claim 19 wherein said securing means comprises a knurled surface on said first end.

21. A fastener as set forth in claim 17 wherein said fastener is a nut, and wherein said first end is open, and wherein a thread extends inwardly into said body from said open end.

22. A fastener as set forth in claim 21 wherein said securing means comprises a knurled surface on said first end.

23. A fastener as set forth in claim 21 wherein said securing means comprises a barb and groove connection between said first end and said separate annular seating member.

24. A fastener as set forth in claim 23 wherein said securing means comprises a knurled surface on said first end.

25. A fastener as set forth in claim 17 including a ridge on said body proximate said first end.

26. A fastener as set forth in claim 25 including a shoulder on said ridge facing said first end, and wherein said separate annular seating member includes a surface which abuts said ridge.

27. A fastener as set forth in claim 26 wherein said securing means comprises a knurled surface on said first end.

28. A fastener as set forth in claim 26 wherein said securing means comprises a barb and groove connection between said first end and said separate annular seating member.

29. A fastener as set forth in claim 28 wherein said securing means comprises a knurled surface on said first end.

30. A fastener as set forth in claim 26 wherein said shoulder is tapered and wherein said surface which abuts said ridge is beveled.

31. A fastener as set forth in claim 30 wherein said shoulder and said surface are in complementary mating relationship.

32. A fastener as set forth in claim 31 wherein said securing means comprises a knurled surface on said first end.

33. A fastener as set forth in claim 31 wherein said securing means comprises a barb and groove connection between said first end and said separate annular seating member.

34. A fastener as set forth in claim 33 wherein said securing means comprises a knurled surface on said first end.

35. A fastener as set forth in claim 17 including a key-receiving configuration on said second end.

36. A fastener as set forth in claim 17 including a wrench-receiving configuration having a portion proximate said second end.

37. A fastener as set forth in claim 17 wherein said body includes a straight annular shoulder, and wherein said separate annular seating member has a straight surface which engages said straight annular shoulder.

38. A fastener as set forth in claim 37 wherein said straight annular shoulder and said straight surface extend substantially perpendicularly to the longitudinal axis of said fastener.

39. A fastener as set forth in claim 37 wherein said securing means comprises a knurled surface on said first end.

40. A fastener as set forth in claim 37 wherein said securing means comprises a barb and groove connection between said first end and said separate annular seating member.

41. A fastener as set forth in claim 40 wherein said securing means comprises a knurled surface on said first end.

42. A fastener as set forth in claim 38 including a key-receiving curvilinear groove in said second end.

43. A fastener as set forth in claim 41 wherein said securing means comprises a knurled surface on said first end.

44. In a tire rim having an outer tire mounting portion, an inner hub, a plurality of axially-extending elongated bores in said hub, and a shoulder at the end of each of said elongated bores, the improvement comprising a fastener in at least some of said plurality of said elongated bores, each of said fasteners comprising an elongated body having a longitudinal axis and an outer surface and first and second ends, a seating configuration on said first end engaging a shoulder, a plurality of splines on said outer surface extending from said second end toward said first end, at least a portion of said splines being located within a bore in which said fastener is located, and a wrench having a wrench body which is internally splined to engage said splines with at least a portion of said wrench body being positioned between said splines and said bore.

45. In a tire rim as set forth in claim 44 wherein said seating configuration comprises a separate annular seating member mounted on said first end of said body.

46. In a tire rim as set forth in claim 44 wherein said first end is open, and a thread extending inwardly into said body from said first end, and wherein said splines overlap said thread.

47. In a tire rim as set forth in claim 46 wherein said seating configuration comprises a separate annular seating member mounted on said first end of said body.

48. In a tire rim as set forth in claim 46 wherein said internal thread extends substantially throughout the length of said bore.

49. In a tire rim as set forth in claim 44 including a ridge between said first and second ends, and a second shoulder on said ridge facing said second end.

50. In a tire rim as set forth in claim 49 including a third shoulder on said ridge facing said first end, and wherein said seating configuration is a separate annular seating member in effective abutting relationship with said third shoulder.

51. In a tire rim as set forth in claim 49 wherein said splines terminate at said ridge.

52. In a tire rim as set forth in claim 51 including a third shoulder on said ridge facing said first end, and wherein said seating configuration is a separate annular seating member in effective abutting relationship with said third shoulder.

53. In a tire rim as set forth in claim 52 wherein said first end is open, and a thread extending inwardly into said body from said first end, and wherein said splines overlap said thread.

54. In a tire rim as set forth in claim 53 wherein said internal thread extends substantially throughout the length of said bore.

55. In a tire rim as set forth in claim 49 including grooves between said splines, and wherein said grooves pass through said ridge.

56. In a tire rim as set forth in claim 55 wherein said splines terminate at said ridge.

57. In a tire rim as set forth in claim 56 including a third shoulder on said ridge facing said first end, and wherein said seating configuration is a separate annular seating member in effective abutting relationship with said third shoulder.

58. In a tire rim as set forth in claim 43 wherein said first end is open, and a thread extending inwardly into said body from said first end, and wherein said splines overlap said thread.

59. In a tire rim as set forth in claim 40 including a ridge between said first and second ends, a second shoulder on said ridge facing said second end, and an end on said wrench body engaging said second shoulder.

60. In a tire rim as set forth in claim 44 wherein said splines include beveled ends proximate said second end.

61. In a tire rim as set forth in claim 49 wherein said splines include beveled ends proximate said second end.

62. In a tire rim as set forth in claim 61 wherein said shoulder includes an inclined surface which is oriented in generally the same direction as said beveled ends of said splines.

63. In a tire rim as set forth in claim 46 wherein said splines terminate at said ridge.

64. In a tire rim as set forth in claim 63 wherein said splines include beveled ends proximate said second end.

65. In a tire rim as set forth in claim 64 wherein said shoulder includes an inclined surface which is oriented in generally the same direction as said beveled ends of said splines.

66. A fastener comprising a body having an outer surface and first and second ends, an internal thread within said body, a seating configuration on said first end, a decorative cap on said second end, and said body having a hexagonal external configuration.

67. A fastener as set forth in claim 66 wherein said decorative cap comprises a front and an annular side which mounts said decorative cap on said second end.

68. A fastener as set forth in claim 67 wherein said second end includes an annular groove, and wherein said annular side includes a ridge which is received in said annular groove.

69. A fastener comprising a body having an outer surface and first and second ends, a bore extending throughout the entire length of said body, an internal thread in said bore, a seating configuration on said first end, and a decorative cap on said second end.

70. A fastener as set forth in claim 69 wherein said decorative cap is in the form of a plug having a portion received in said bore.

71. A fastener as set forth in claim 70 wherein said portion of said plug is received in threaded relationship in said bore.

72. A fastener as set forth in claim 69 wherein said body has a hexagonal external configuration.

* * * * *

UNITED STATES PATENT AND TRADEMARK OFFICE
CERTIFICATE OF CORRECTION

PATENT NO.    : 6,357,981 B1
DATED         : March 19, 2002
INVENTOR(S)   : Thomas R. Lanham et al.

It is certified that error appears in the above-identified patent and that said Letters Patent is hereby corrected as shown below:

Column 3,
Line 33, change "FIG. 16" to -- FIG. 18 --.

Column 11,
Line 6, change "41" to -- 42 --.

Column 12,
Line 7, change "43" to -- 57 --;
Line 11, change "40" to -- 44 --;
Line 24, change "46" to -- 49 --.

Signed and Sealed this

Third Day of September, 2002

Attest:

JAMES E. ROGAN
Attesting Officer            Director of the United States Patent and Trademark Office